United States Patent [19]

Stanton

[11] 4,128,944
[45] Dec. 12, 1978

[54] MICROSCOPE ASSEMBLY

[76] Inventor: Martin G. Stanton, 9 Priestden Park, St. Andrews, Fife, Scotland

[21] Appl. No.: 751,481

[22] Filed: Dec. 16, 1976

[30] Foreign Application Priority Data

Dec. 18, 1975 [GB] United Kingdom ............... 51985/75

[51] Int. Cl.² ............................................. G02B 21/32
[52] U.S. Cl. ..................................... 33/180 R; 350/90
[58] Field of Search ................. 33/180 R; 350/81, 82, 350/85, 86, 90, 8; 356/150, 138, 445 T; 74/471; 29/407; 248/178

[56] References Cited

U.S. PATENT DOCUMENTS

| | | | |
|---|---|---|---|
| 2,775,158 | 12/1956 | Mitchell | 350/85 |
| 2,794,362 | 6/1957 | Yale | 356/138 |
| 3,179,260 | 4/1965 | Ferlen | 350/90 |

Primary Examiner—Richard E. Aegerter
Assistant Examiner—Willis Little
Attorney, Agent, or Firm—Oblon, Fisher, Spivak, McClelland & Maier

[57] ABSTRACT

A microscope frame assembly comprising a pair of parallel rings rigidly mounted on a base and there being mounted on the rings,
(a) a support for the eyepiece and other optics of a microscope which includes an adjustable stage and
(b) at least one support for at least one microelectrode and manipulator therefor, both said supports being adjustable in position around the circular path defined by the said pair of rings.

The stage is carried by a subframe which extends from the support for the microscope and includes controls for effecting X, Y and Z movements.

6 Claims, 1 Drawing Figure

U.S. Patent
Dec. 12, 1978
4,128,944
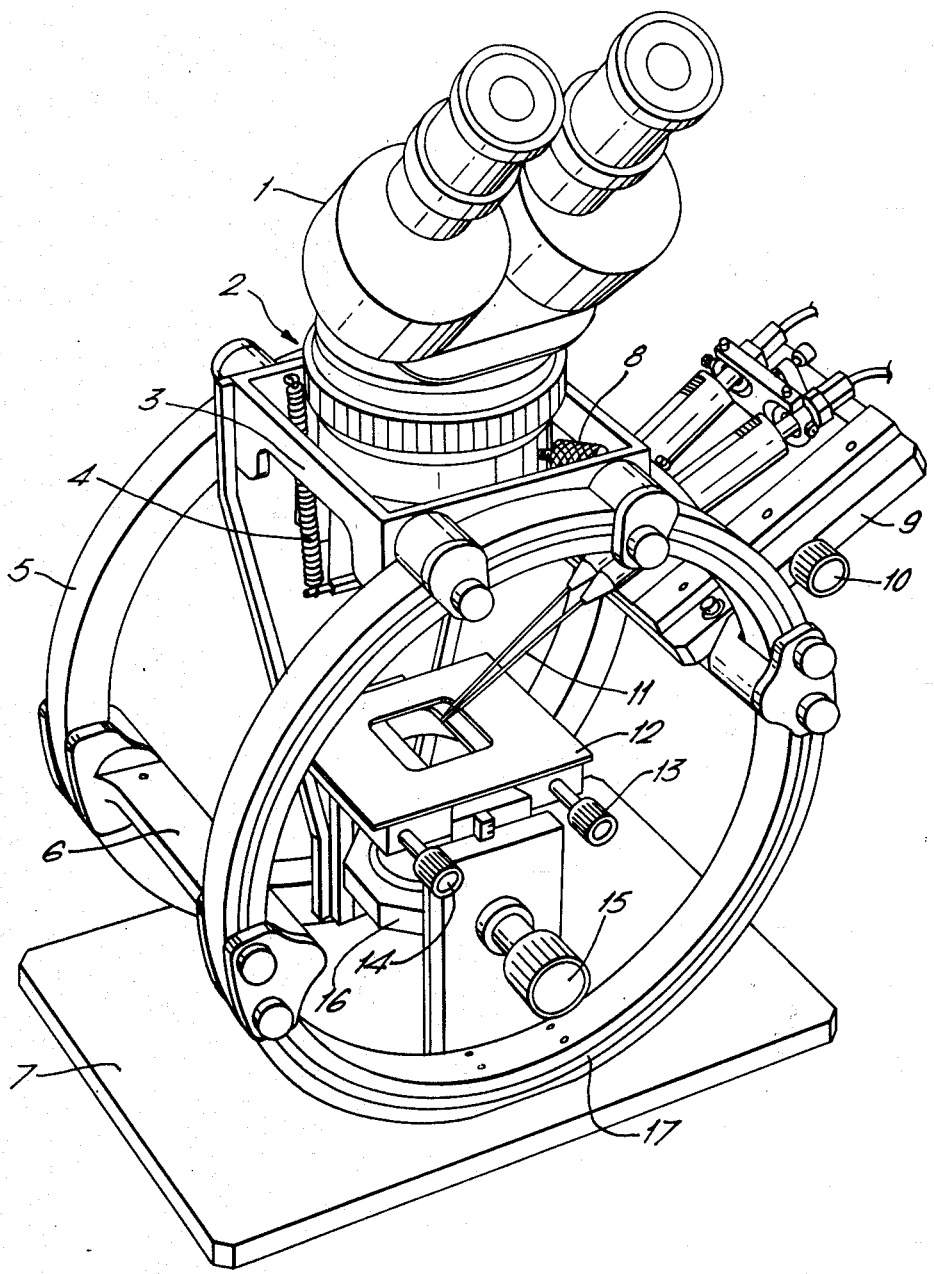

MICROSCOPE ASSEMBLY

BACKGROUND OF THE INVENTION

1. Field of the Invention

This invention concerns light microscopes and in particular a frame therefor which facilitates the positioning of a living cell or tissue in the field of the microscope and facilitates the implantation of microelectrodes into a cell of the tissue. A microscope which incorporates such a frame will therefore constitute the mechanical and optical equipment required by the electrophysiologist, although the equipment is not limited to this application. The microscope has been designed with a view to providing in one integral unit all the known demands of electrophysiologists with one exception, namely whole brain stereotactic studies which require specialist equipment.

2. Description of the Prior Art

When a conventional micromanipulator on its stand is placed beside a microscope on its stand there is considerable flexibility in the system if one considers the loop from microelectrode through the manipulator, stands, baseplate and microscope frame, to the preparation. Relative movement between microelectrode and preparation is hard to avoid and even the slightest vibrations in the system will immediately tear the tissue and terminate a successful microelectrode impalement.

SUMMARY OF THE INVENTION

It is an object of the present invention to reduce the possibility of relative movement between microelectrode and preparation.

In a microscope assembly which includes at least one micromanipulator the latter is rigidly mounted on a frame on which at least the microscope stage is also rigidly mounted.

In a preferred embodiment of the invention, the frame on which the optical and mechanical parts are mounted comprises two rigid parallel spaced apart rings and the micromanipulator and other devices are adapted to be clamped therearound. Preferably the construction of the clamps which hold the devices on the frame is such that, when clamped, the devices and the frame form a rigid box structure.

The stage may be mounted on the rings in such a way that it can tilt or, since all the other devices can be moved relative to it and in any case the stage will normally be required to be level to carry a small tissue bath filled with fluid, the stage can be rigidly mounted on a subframe which is rigidly mounted on a base on which the frame is also rigidly mounted.

The optical parts of the microscope are mounted on a subframe, itself mounted on the frame and partially extending below the stage for carrying a rack and pinion assembly with slides carrying the substage optics for a compound microscope. Thus the optical system may be tilted relative to the stage, taking the substage optics with it. Clearly only a limited amount of tilt is possible or even useful with a compound microscope at high power, but, for experiments where the lower power of a stereo dissecting microscope or the like is adequate, a full 90° of tilt is available when, of course, the substage optics would not be used.

Preferably the micromanipulator employed in the system comprises that described in co-pending British patent application No. 13283/75, although, of course, any make of micromanipulator may be used if suitably adapted. A micromanipulator of patent application No. 13283/75 is to be preferred since it is designed to make best use of the properties to the system and also avoid contact of the hand with the micromanipulator head during insertion of a microelectrode into a cell with the risk of attendant distortion of the mechanism under pressure of the hand.

Without any loss of convenience, two or more micromanipulators may be mounted on the frame and, if each head is a double unit, four or more microelectrodes may be brought to bear on one tissue.

It should also be noted that the invention will allow a rise and fall microscope head to be employed with a rise and fall stage. Conventional microscope frames do not normally provide both but it greatly aids the electrophysiologist to have both since he not only has to focus the preparation but also to find the microelectrode in the microscope field, line it up and direct it towards the desired point on the preparation. This is further facilitated in the preferred embodiment in which all the parts are movable around the same circle so that microscope optics and manipulators are always pointing at the preparation whatever their relative orientation.

BRIEF DESCRIPTION OF THE DRAWING

In the drawing, the single FIGURE is a perspective view of a light microscope embodying the invention.

DESCRIPTION OF THE PREFERRED EMBODIMENT

Referring to the drawing, the microscope comprises a stereo zoom dissecting microscope head 1 which is attached to and centered in a subframe 3 which can be clamped rigidly onto the improved microscope frame embodying the invention. A focus control 2 is provided, which can only just be seen in the drawing, for adjusting the focus of the microscope.

The microscope head is supported within the subframe 3 by means of springs 4 which serve to offset the weight of the microscope head.

The frame on which the microscope is mounted comprises two circular rings 5 which are arranged in a parallel spaced apart manner and are attached to a base plate 7. The subframe 3 is adapted to be secured rigidly to the two rings 5.

The microscope head may be rotated as is more convenient when the microscope is tilted and the head includes a clamping screw 8 for securing the microscope head in position.

Two micromanipulators are mounted on a micromanipulator head assembly which includes a coarse sledge advance control 10 for moving the micromanipulators relative to the frame 3.

The micromanipulators include microelectrodes 11 which, as shown in the drawing, extend down towards the stage on which a specimen is to be mounted. As is known in the art, the microelectrodes are adjusted in known manner so that the leading ends of the microelectrodes are impaled into a specimen (not shown) on the stage 12.

The stage is adapted to be manipulated in an x and a y direction by means of controls 13 and 14 and can be adjusted in height relative to the baseplate 7 using a further control 15.

The substage lighting system (condensers, lamp, etc.) for use with compound microscope head is shown in the drawing at reference numeral 16. Vertical rack adjustment for the condenser assembly 16 is not visible in the particular view selected for the drawing.

A circular component clamping and locating slot is provided in the outer face of each of the two circular rings 5 for receiving the leading ends of bolts incorporated in the subframe.

The form of the microelectrode assembly 9 constitutes that described in patent application No. 13283/75.

The following routine should be followed for setting up a preparation and impaling it with a microelectrode.

1. The microscope optical axis and the microelectrode axis are set to be at 90° to each other so that the microelectrode, once found in the microscope field, should remain in focus as the fine longitudinal manipulation is performed to insert the microelectrode in a cell. In this respect, the drawing accompanying this application does not show the preferred embodiment most conveniently set up in that the micromanipulator head has been set at approximately 45° to the microscope. It is to be understood that an arrangement in which the microelectrode is perpendicular to the microscope optical axis is not always easy to obtain and this is particularly the case when more than one micromanipulator head is secured on the frame.
2. The microscope is set by its focus control 2 so that its focal point is on the axis of the two rings 5. This is done using a predetermined mark on the focusing sledge.
3. The preparation is mounted on the stage 12 in its bath and orientated suitably.
4. The apparatus is then brought up to focus, using the stage vertical sledge adjustment 15, and the desired position manipulated into the field, using the stage traverse.
5. The stage is now lowered and the microelectrodes are advanced, using the sledge adjustment 10. The electrodes are adjusted sideways until their tips are brought into the microscope field, noting that the tip must be viewed under the bathing fluid if the preparation is submerged and remembering also that depth of immersion affects the apparent optical distance of the tip and hence its focus.
6. The microelectrode is then retracted along its axis until almost clear of the microscope field.
7. The preparation is then wound up again to the focus position and the electrode is advanced making necessary lateral corrections until it is impaled in the tissue.

An additional optical aid to avoid the problems of (a) the fluid surface not being perpendicular to the microscope axis (if the microscope is tilted) and (b) a non-flat focal plane is submerged preparations resulting is difficulties in keeping the microelectrode in focus as it is advanced, is to attach to the microscope objective mount a glass tube with an optical flat window of suitable diameter sealed to the end and arranged to dip into the fluid in the bath. In the case of the compound microscope at high power, it is conceivably better to use a water-immersion objective.

A further advantage of the microscope shown in the drawing is that it will allow hanging drop experiments. Such a procedure has been used by researchers to impale unicellular organisms wherein the organisms is trapped in a hanging drop underneath the slide. This may be done simply by dismantling the stage from the sledge as shown in the drawing and inverting it and refixing. The surface of the stage which manipulates transversely (13, 14) has a magnetic surface to aid fixing of tissue baths and preparations by quick simple magnetic clamps which is quick and firm. Where the organism is so hanging below the slide, the micromanipulator housing or housings is or are moved further round so that the microelectrodes extend in an upward direction towards the tissue to be impaled.

With this in mind, the stage vertical sledge is provided with ample movement so that deep preparations and baths up to about 5 cm deep may be accommodated.

It is to be understood that the rigidity of the frame of the device shown in the drawing is sufficiently strong to allow a close circuit television camera to be mounted above the microscope without difficulty. In addition, or alternatively, photographic equipment may be mounted in the usual way.

It is to be understood that the invention is not limited to the particular arrangement shown in the drawing and described in the foregoing text. Many variations and changes are possible to the arrangement as shown within the ambit of my invention, the scope of which is defined solely by the following claims.

I claim:

1. An assembly of a microscope which includes a stage and at least one micromanipulator, comprising a base, two rigid parallel spaced apart rings mounted on said base, said base and rings together forming a rigid main frame on which at least said microscope stage and said at least one micromanipulator are rigidly mounted, and means for mounting said microscope stage on said rings whereby said microscope stage can be tilted.

2. An assembly of a microscope which includes a stage and at least one micromanipulator comprising a base and two rigid parallel spaced apart rings mounted thereon, said base and rings together forming a rigid main frame on which at least said microscope stage and said at least one micromanipulator are rigidly mounted, in which the microscope includes and eyepiece and other optics, which further comprises a subframe tiltably mounted on said rigid main frame on which the eyepiece and other optics are mounted and having an extension which extends below the stage to provide a substage support, whereby if said subframe carrying the eyepiece and other optics above the stage is tilted relative to the stage, the substage support below the stage is tilted in a corresponding manner.

3. An assembly as set forth in claim 2 further comprising substage optics mounted on said substage support.

4. An assembly of a microscope which includes a stage and at least one micromanipulator, comprising a base and two rigid parallel spaced apart rings mounted thereon, said base and rings together forming a rigid main frame on which at least said microscope stage and said at least one micromanipulator are rigidly mounted, a first subframe being rigidly mounted on said base, said microscope stage being rigidly mounted on said first subframe, and said micromanipulator and other parts of the apparatus being movable relative to the base and therefore to the stage.

5. An assembly as set forth in claim 4 in which the microscope includes an eyepiece and other optics, which further comprises a second subframe tiltably supported on said rigid main frame on which the eyepiece and other optics and mounted and having an extension which extends below the stage to provide a substage support, whereby if the second subframe carrying the eyepiece and other optics above the stage is tilted relative to the stage, the substage support below the stage is tilted in a corresponding manner.

6. An assembly as set forth in claim 5, further comprising substage optics mounted on said substage support.

* * * * *